United States Patent [19]

Mansberger, II

[11] 4,443,173

[45] Apr. 17, 1984

[54] MOLDING APPARATUS INCLUDING INSERT FEEDING MEANS

[75] Inventor: Robert L. Mansberger, II, Middletown, Pa.

[73] Assignee: AMP Incorporated, Harrisburg, Pa.

[21] Appl. No.: 477,055

[22] Filed: Mar. 21, 1983

[51] Int. Cl.³ .................. B29C 1/00; B29D 3/00; B29F 1/022
[52] U.S. Cl. ............................. 425/126 R; 425/110
[58] Field of Search ............... 425/110, 123, 124, 125, 425/126 R, 127, 129 R, 577

[56] References Cited

U.S. PATENT DOCUMENTS 3,303,256  2/1967  Morin .................................. 425/129
3,837,772  9/1974  Van De Walker et al. .... 425/126 R Primary Examiner—Willard E. Hoag
Attorney, Agent, or Firm—Russell J. Egan

[57] ABSTRACT

Apparatus for dispensing individual inserts into proper position for subsequent molding operation includes a feed tube extending normal to the closing axis of the mold at the position of the insert and a feed track leading from a hopper to intersect the feed tube. A transfer pin associated with each feed tube, and secured to the molding mechanism, drives an insert from the feed track through the feed tube into position within the mold. A lever assembly in the mold, and actuated by the activation thereof, allows only a single insert to drop through the feed track for each closure of the mold.

8 Claims, 6 Drawing Figures

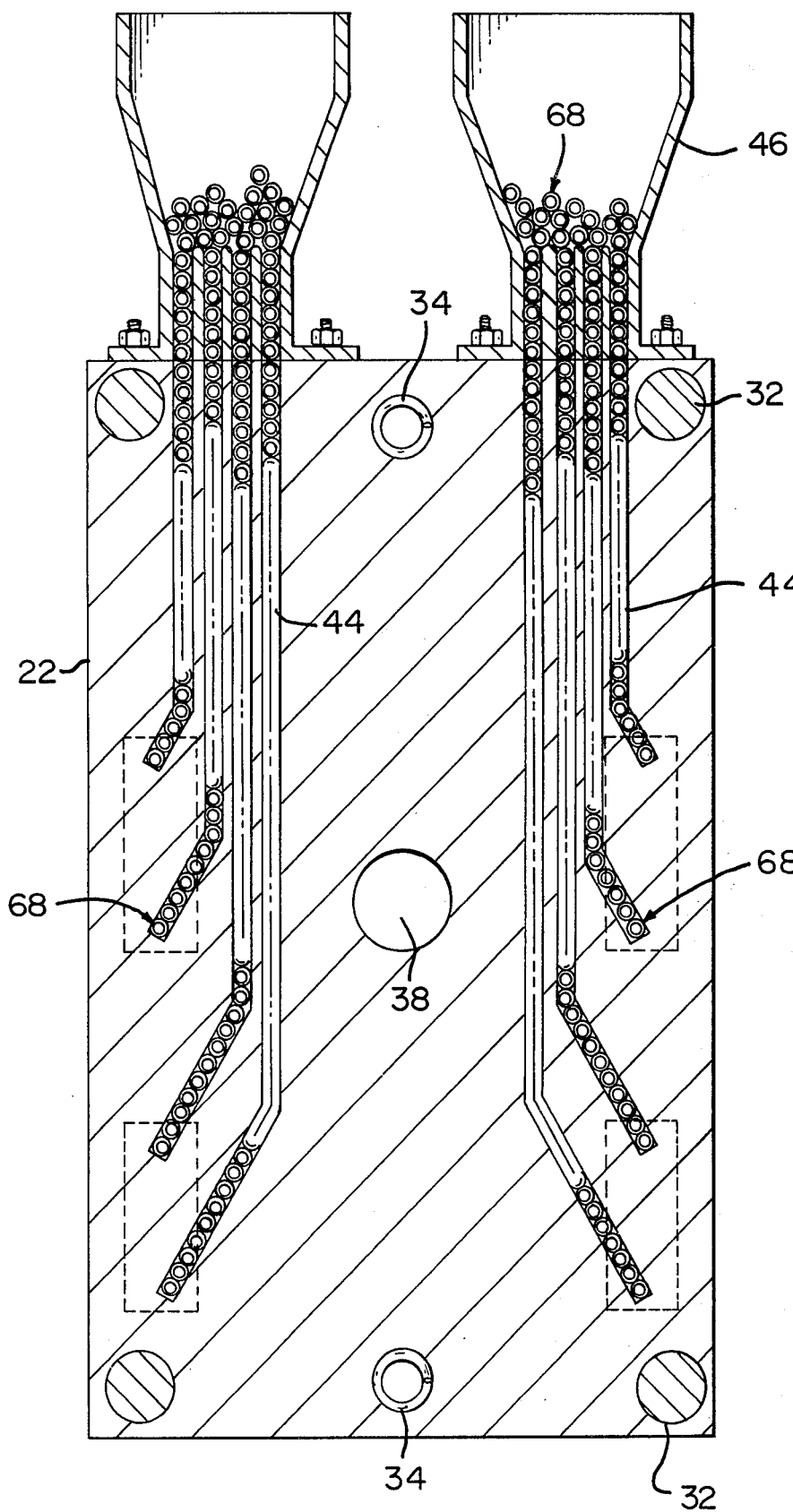

MOLDING APPARATUS INCLUDING INSERT FEEDING MEANS

The present invention pertains to a method and apparatus for feeding inserts to be subsequently molded into a housing of an electrical connector or the like and in particular to a mechanism which will prevent binding of the inserts as they are fed to the molding station.

Many electrical connectors are formed with plastic housings having integral mounting flanges. Because of the nature of plastics material, it is not always possible to directly utilize the plastics material for mounting purposes since it will not accept high forces such as might be applied by a screw thread. It has heretofore been the practice to mold the connector housing and then, in a separate operation, heat stake metal inserts into the housing. This has a number of disadvantages among which are the fact that a separate operation must be utilized, that there is a requirement for aligning the insert prior to the staking operation, a heating operation is involved and some of the plastics material will get dislocated as the insert is staked and this material can flow in such a way as to interfere with the insert and/or create a product which does not have a pleasing appearance.

The present invention overcomes the difficulties of the prior art by providing a method and apparatus for individually dispensing inserts and positioning them in a mold wherein the inserts will be properly positioned in the fully molded article, said dispensing means providing separation between the dispensed insert and the next successive insert so that binding of the inserts will be obviated.

An embodiment of the present invention will now be described by way of example with reference to the accompanying drawings in which:

FIG. 6 is a section view taken along line 6—6 of FIG. 2 showing the dispensing portion of the present invention.

Figure 1:
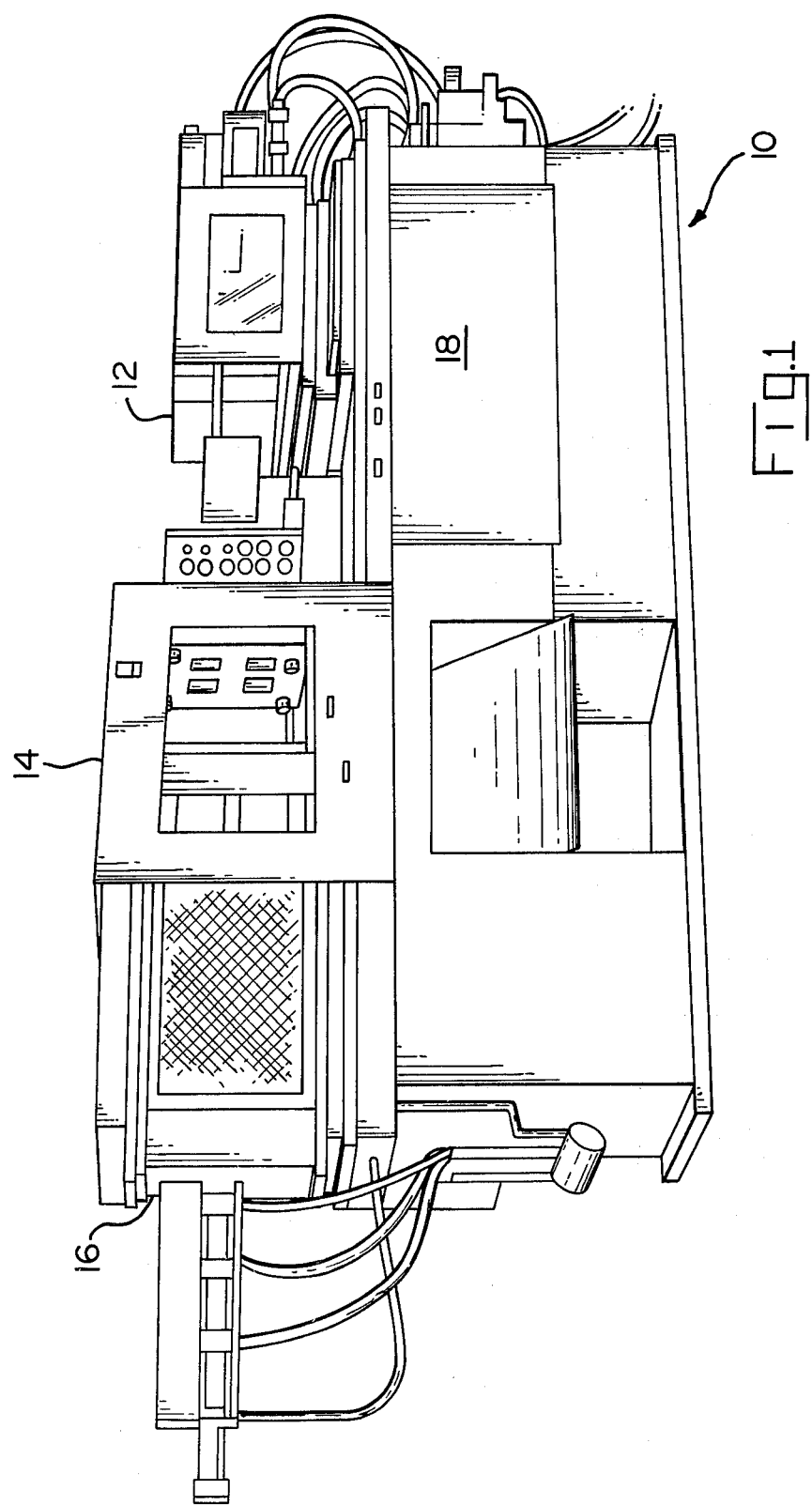
FIG. 1 is a perspective view of a molding machine which could incorporate the present invention.
Figure 2:
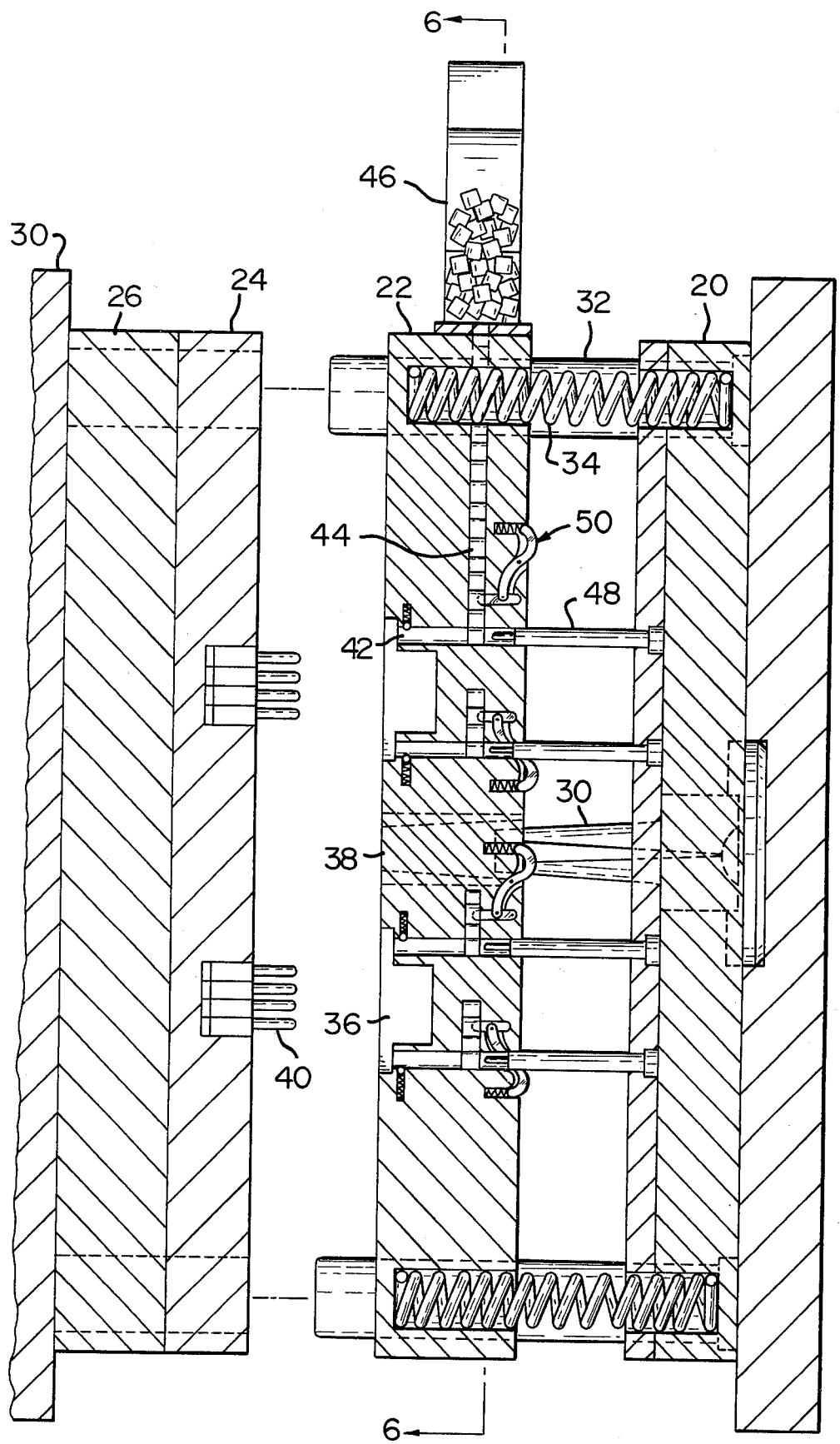
FIG. 2 is a side elevation, partially in section, showing the molding station of the machine of FIG. 1 in an open condition.

FIG. 1 shows in perspective view a typical fully automatic plastic injection molding apparatus 10 having a reciprocating screw plasticizing injection assembly 12, a high force clamping, molding station 14, a drive portion including electric and hydraulic motors, pumps, coolers, heaters and the like, and a control assemble 18 including all of the control and drive functions and warning lights.

FIGS. 2 to 6 show the present invention which is mounted in the clamping, molding station 14 of the press of FIG. 1. The molding station 14 includes a top clamp plate 20, an A cavity mold plate 22, a B cavity mold plate 24, a back-up plate 26, and an ejector housing 30. The top clamp plate 20 is fairly standard in having a centralized sprue bushing 30 guide rods or leader pins 32, and compression springs 44. The A cavity plate 22 has a plurality of cavities 36 formed therein facing the B cavity plate and a central aperture 38 through which the sprue bushing 30 extends. The B cavity plate 24 carries a plurality of core pins 40 each aligned with a respective cavity 36 in the A cavity plate 22. The back-up plate 26 and the ejector housing 30 are of well known type and will not be described with any detail.

The present invention is most closely associated with the top clamp plate 20 and the A cavity plate 22. It includes a plurality of feed tubes 42 formed within the A cavity plate and each leading to an appropriate portion of a respective cavity 36. Extending essentially normally from the axis of each feed tube 42 is a feed track 44, best seen in FIG. 6. Each feed track 44 extends through plate 22 to a hopper 46 which is mounted at the top of the A cavity mold plate 22. The invention further includes a plurality of transfer pins 48 each fixed to the top clamp plate 20 and aligned to pass axially through a respective feed tube 42. A feed assembly 50 is included in each feed track 44 and is formed by a lever arm 52 which is pivotally mounted intermediate its ends on pivot pin 54. A bias spring 56 engages one end of arm 52 and, a locking pin 58 is connected to the other end thereof for movement into and out of a respective feed track 44. The invention also includes a ball plunger 60 at the inner end of each respective feed tube 42. Each plunger has a formed bore 62 with a ball 64 mounted therein and biased by spring 66.

Figure 3:
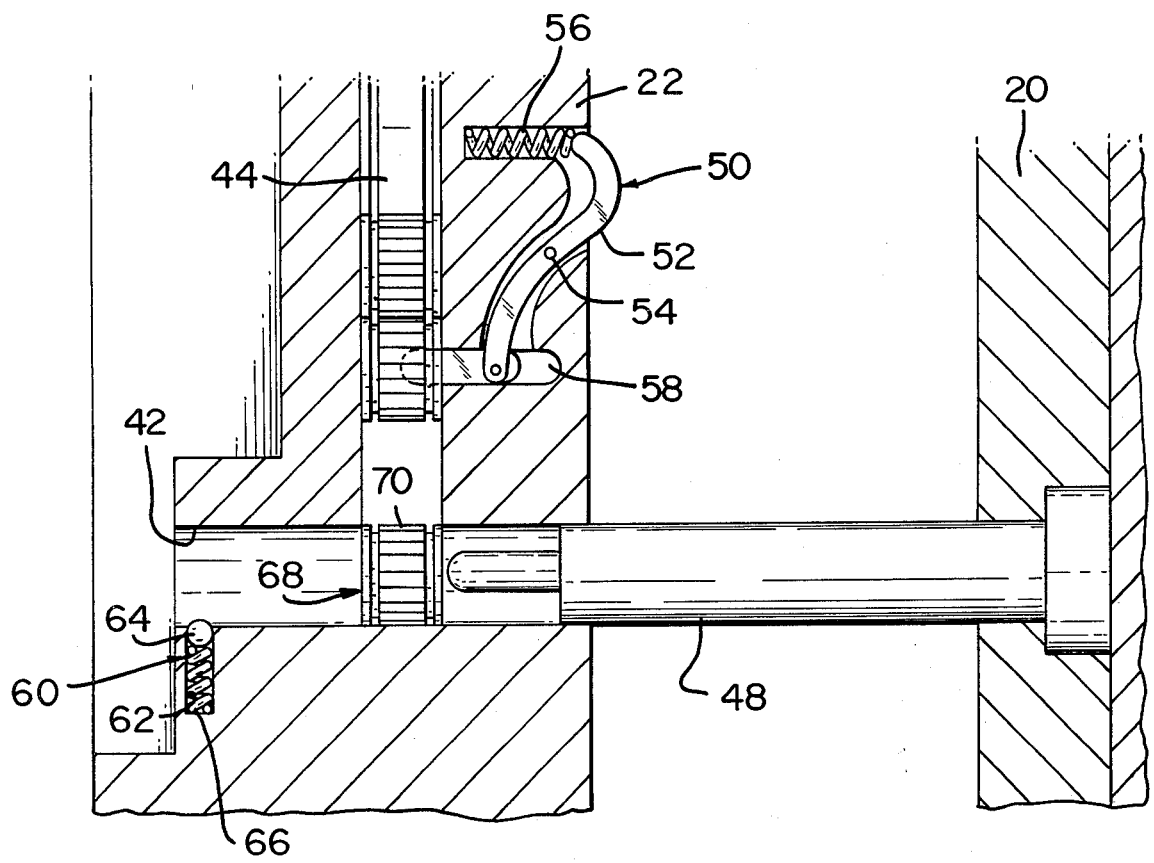
FIG. 3 is a detail of the present invention as shown in FIG. 2.
Figure 5:
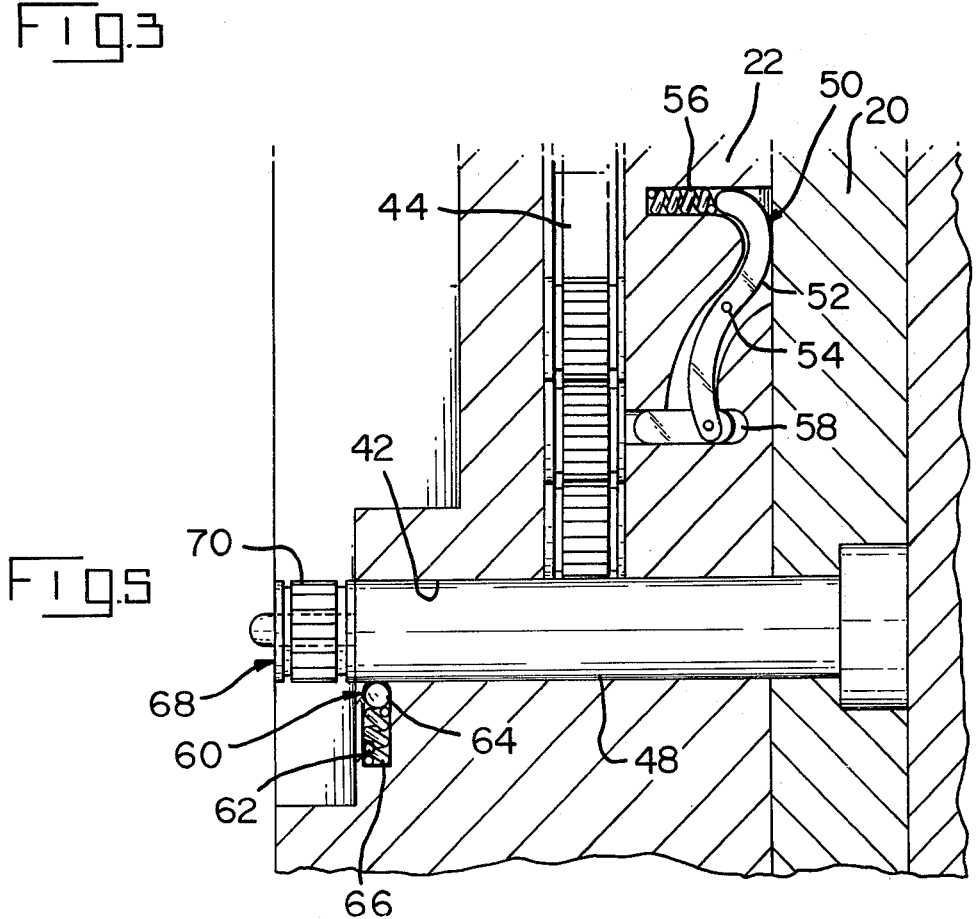
FIG. 5 is a detail of the present invention as shown in FIG. 4.

The insert 68, as best seen in FIGS. 3 and 5, is a metal cylinder which preferably has a threaded internal bore and has knurling 70 on the exterior surface to improve the gripping retention of the insert in the molded article.

Figure 4:
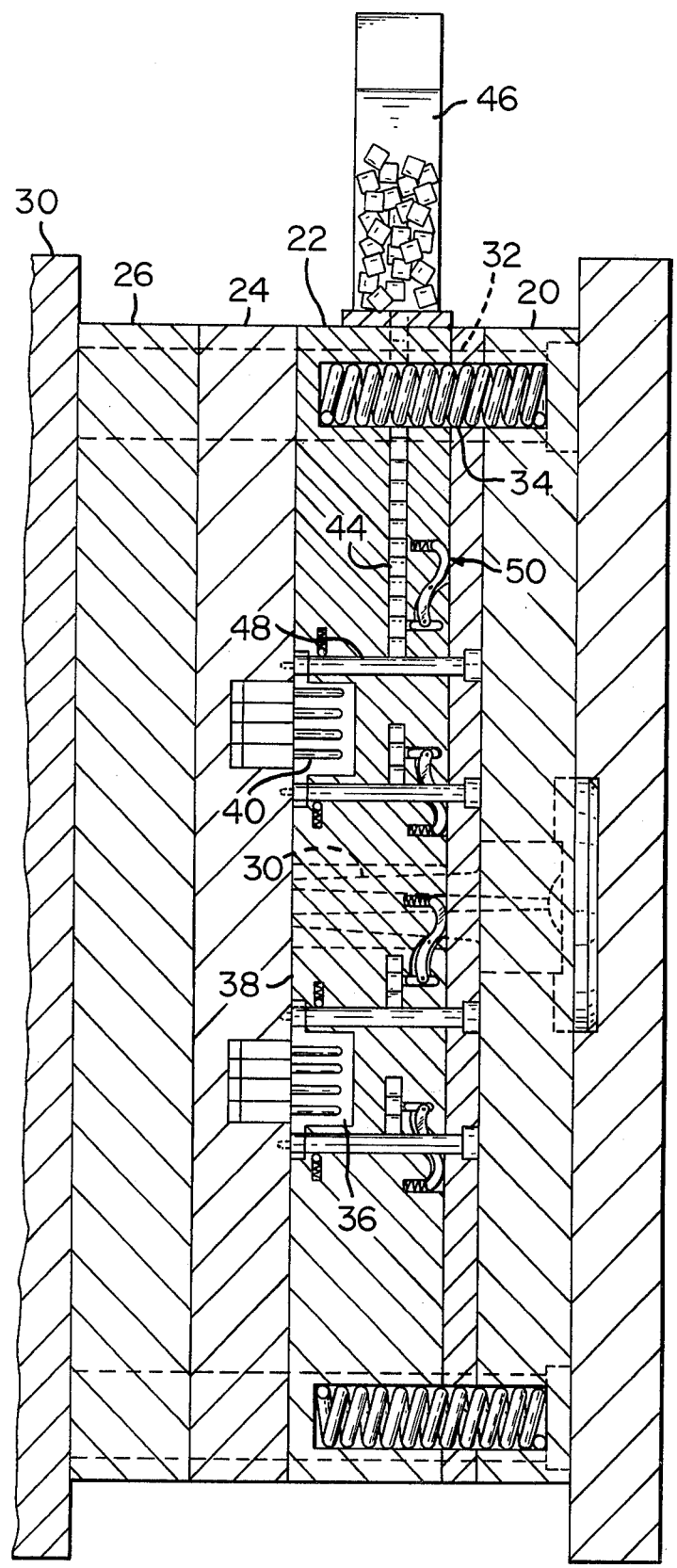
FIG. 4 is a side elevation, partially in section, similar to FIG. 2 showing the molding station in the closed position.

In operation the inserts 68 are loaded into the hopper 46 where they fall into the respective feed tracks 44 and fill them up. They are initially restrained from dropping into the respective feed tubes 42 by the respective locking pins 58, which would be in the position shown in FIGS. 2 and 3. The initial closure of the top clamp plate 20 against the A cavity mold plate 22 will cause the lever arms 52 rotate about pins 54 against the bias of springs 56 to withdraw the locking pins 58 allowing the insert 68 to drop down to rest on the respective transfer pin 48, as shown in FIGS. 4 and 5. As the top clamp plate 20 is withdrawn from the A cavity plate 22, the lever arm 52 rotates about pivot pin 54 under the influence of spring 54 to insert the locking pin 58 into the bore of the next sequential insert 68. As the top clamp plate 20 completes its withdrawal motion, the transfer pins 48 will be completely removed from beneath the inserts 68 in the respective feed tracks 44 allowing the inserts 68 to drop into the respective feed tubes 42. The next closing movement of the top clamp plate 20 will cause the transfer pins 48 to drive the inserts 68 through the feed tubes 42 to their respective positions in the mold cavity 36.

The ball plunger 60 located at the end of each feed tube 42 serves two purposes, the first of which is, as the mold begins the closing stroke, the insert 68 may not have fully engaged with the pilot portion of the transfer pin 48. When the insert 68 reaches the ball plunger 60, the insert will be restricted slightly causing the pilot of the transfer pin 48 to enter the insert 68 if it hasn't already done so. The second function is a solution for a short shot problem. If the cavity sees a short shot of plastic, for any one of many reasons, the insert 68 will tend to remain on the pilot portion of the transfer pin 48. As the mold opens, the insert 68 will be drawn back against the restriction of the ball plunger 60 and will be stripped from the pilot allowing the insert 68 to fall from the open mold.

It will be appreciated that by separating the insert 68 which is to be driven into the mold from the column of inserts in the feed track 44 any binding of the knurling, which could cause the complete misfeed or jamming of the machine, will be prevented.

I claim:

1. In combination with a molding apparatus having first and second cavity mold plates, a back-up plate to support said first cavity mold plate, a top clamp plate adapted to drive the second cavity mold plate with respect to said first cavity mold plate, the mold plates together defining therebetween a plurality of mold cavities and including channels for flow of molding material from a central discharge point to each mold cavity, means to feed individual inserts into the mold cavities to be molded therein, said means comprising a plurality of feed tubes in said second cavity mold plate each opening into a respective one of said cavities at a position for an insert, a feed hopper at one end of said second cavity mold plate, a like plurality of feed tracks extending normal to the axis of a respective one of said feed tubes providing gravity feed communication between said feed hopper said feed tube, means in each said feed track allowing a single insert to be dispensed from the feed track into the feed tube with each closure of said mold apparatus, and a like plurality of transfer pins secured to said top clamp plate each aligned to extend into a respective feed tube whereby relative closure motion of said top clamp plate and said second mold plate causes said transfer pins to move through said feed tubes driving said inserts into the correct location in the respective mold cavities.

2. The combination according to claim 1 further comprising:
a spring loaded ball plunger in each said feed tube adjacent said cavity whereby an insert will encounter resistance of said plunger on movement into said cavity and be properly seated on said transfer pin and upon withdrawal of said transfer pin said plunger strips said insert from said pin.

3. The combination according to claim 1 wherein said means in each said feed track allowing a single insert to be dispensed comprises:
a locking pin mounted for movement into and out of said feed track at a point spaced from the respective feed tube a distance slightly greater than the diameter of an insert, and
lever means responsive to said relative closure motion of said top clamp plate to withdraw said locking pin from a normal position extending into said feed track whereby an insert is dispensed to said feed tube and lies out of contact with the next successive insert.

4. The combination according to claim 3 wherein said lever means comprises:
a lever pivotally mounted intermediate it's ends,
spring means acting on one end of said lever, and
said locking pin connected to the other end of said lever to be driven thereby.

5. A mold apparatus having an A cavity plate containing a plurality of mold cavities and a B cavity plate containing a plurality of arrays of core pins, each array being aligned with a respective cavity, a back-up plate supporting said B cavity plate, and a top clamp plate mounted to drive the A cavity plate with respect to the B cavity plate, means to feed single inserts into predetermined locations in the respective mold cavities characterized by a feed tube intersecting a mold wall defining a mold cavity at a point for each said insert, a feed hopper, a feed track extending normal to the axis of each feed tube and providing communication between said hopper and said feed tube, and a transfer pin carried by said top clamp plate extending into each said feed tube to pick up an insert from the feed track and drive it into said mold cavity.

6. The mold apparatus according to claim 5 further characterized by means allowing the dispensing of a single insert per feed track for each closure of said mold and comprising, in each feed track, a spring biased lever means engaging the penulimate insert in said feed track and preventing it from moving in said track when said mold is in an open position.

7. The mold apparatus according to claim 6 wherein said means are characterized by:
a locking pin mounted for movement into and out of said feed track at a point spaced from said feed tube a distance greater than the diameter of an insert, and
lever means responsive to said top clamp plate and connected to drive said locking pin from a normal position extending into said feed tube thereby allowing an insert to be dispensed.

8. The mold apparatus according to claim 5 further characterized by:
a spring loaded ball plunger in each said feed tube adjacent said cavity whereby resistance to passage of an insert will be applied to properly set said insert on said transfer pin on the way into the cavity and strip said insert from said transfer pin as it is withdrawn.

* * * * *